United States Patent
Loinaz (10) Patent No.: US 8,700,944 B2
(45) Date of Patent: Apr. 15, 2014

(54) PROGRAMMABLE DRIVE STRENGTH IN MEMORY SIGNALING

(71) Applicant: NetLogic Microsystems, Inc., Irvine, CA (US)

(72) Inventor: Marc Loinaz, Palo Alto, CA (US)

(73) Assignee: Netlogic Microsystems, Inc., Irvine, CA (US)

( * ) Notice: Subject to any disclaimer, the term of this patent is extended or adjusted under 35 U.S.C. 154(b) by 0 days.

(21) Appl. No.: 13/762,927

(22) Filed: Feb. 8, 2013

(65) Prior Publication Data

US 2013/0159612 A1 Jun. 20, 2013

Related U.S. Application Data

(63) Continuation of application No. 12/728,101, filed on Mar. 19, 2010, now Pat. No. 8,423,814.

(51) Int. Cl.
*G06F 1/00* (2006.01)
*G06F 1/04* (2006.01)
*G06F 13/00* (2006.01)

(52) U.S. Cl.
USPC ............................ 713/500; 713/600; 711/154

(58) Field of Classification Search
USPC ............................................... 713/500
See application file for complete search history.

(56) References Cited

U.S. PATENT DOCUMENTS

| | | |
|---|---|---|
| 3,601,543 A | 8/1971 | Maniere et al. |
| 3,784,751 A | 1/1974 | Arndt |
| 4,021,757 A | 5/1977 | Nossen |
| 4,110,558 A | 8/1978 | Kageyama et al. |
| 4,314,212 A | 2/1982 | Gradl |
| 4,507,629 A | 3/1985 | Frank |
| 4,586,010 A | 4/1986 | Linnenbrink |
| 4,621,242 A | 11/1986 | Theall et al. |
| 5,124,670 A | 6/1992 | Lawton |
| 5,365,547 A | 11/1994 | Marinaro |
| 5,430,773 A | 7/1995 | Marbot |
| 5,471,162 A | 11/1995 | McEwan |
| 5,488,627 A | 1/1996 | Hardin et al. |
| 5,519,342 A | 5/1996 | McEwan |
| 5,559,474 A | 9/1996 | Matsumoto et al. |
| 5,712,583 A | 1/1998 | Frankeny |
| 5,712,882 A | 1/1998 | Miller |

(Continued)

OTHER PUBLICATIONS

Mansuri et al., A Low-Power Low-Jitter Adaptive-Bandwidth PLL and Clock Buffer, ISSCC 2003/Session 24/Clock Generation/Paper 24.5, ISSCC 2003/Feb. 12, 2003/Salon 8/ 3:45PM, 2003 IEEE International Solid-State Circuits Conference.

(Continued)

*Primary Examiner* — Suresh Suryawanshi
(74) *Attorney, Agent, or Firm* — Sterne, Kessler, Goldstein & Fox P.L.L.C.

(57) ABSTRACT

Embodiments of the invention relate to programmable data register circuits and programmable clock generation circuits For example, some embodiments include a buffer circuit for receiving input data and sending output data signals along a series of signal lines with a signal strength, and a signal modulator configured to determine the signal strength based on a control input. Some embodiments include a clock generation circuit for receiving clock reference and sending output clock signals along a series of signal lines with a signal character, and a signal modulator configured to determine the signal character based on a control input.

20 Claims, 6 Drawing Sheets

(56) References Cited

U.S. PATENT DOCUMENTS

| | | |
|---|---|---|
| 5,774,084 A | 6/1998 | Brombaugh et al. |
| 5,864,250 A | 1/1999 | Deng |
| 6,125,157 A | 9/2000 | Donnelly et al. |
| 6,167,467 A | 12/2000 | Itoh et al. |
| 6,226,332 B1 | 5/2001 | Agazzi et al. |
| 6,242,990 B1 | 6/2001 | Sokolov |
| 6,285,726 B1 | 9/2001 | Gaudet |
| 6,317,008 B1 | 11/2001 | Gabara |
| 6,466,098 B2 | 10/2002 | Pickering |
| 6,535,043 B2 | 3/2003 | Chen |
| 6,570,946 B1 | 5/2003 | Homol et al. |
| 6,631,144 B1 | 10/2003 | Johansen |
| 6,650,157 B2 | 11/2003 | Amick et al. |
| 6,674,824 B1 | 1/2004 | Chiueh et al. |
| 6,680,681 B1 | 1/2004 | Hsu et al. |
| 6,693,496 B1 | 2/2004 | Lebouleux |
| 6,828,864 B2 | 12/2004 | Maxim et al. |
| 6,901,126 B1 | 5/2005 | Gu |
| 6,927,611 B2 | 8/2005 | Rhee et al. |
| 6,961,546 B1 | 11/2005 | Rofougaran et al. |
| 6,967,513 B1 | 11/2005 | Balboni |
| 6,999,543 B1 | 2/2006 | Trinh et al. |
| 7,005,885 B1 | 2/2006 | Feldman |
| 7,113,035 B2 * | 9/2006 | Koukkari et al. ............ 330/136 |
| 7,532,079 B2 * | 5/2009 | Shen et al. ............ 331/116 FE |
| 8,072,858 B2 * | 12/2011 | Fujiune et al. ............ 369/53.14 |
| 8,102,936 B2 | 1/2012 | Sidiropoulos et al. |
| 8,155,236 B1 | 4/2012 | Sidiropoulos et al. |
| 8,164,395 B2 | 4/2012 | Kobayashi et al. |
| 8,369,369 B2 | 2/2013 | Sidiropoulos et al. |
| 2001/0043649 A1 | 11/2001 | Farjad-Rad |
| 2003/0081709 A1 | 5/2003 | Ngo et al. |
| 2003/0086501 A1 | 5/2003 | Dreps et al. |
| 2003/0091139 A1 | 5/2003 | Cao |
| 2003/0138008 A1 | 7/2003 | Riaziat et al. |
| 2003/0161430 A1 | 8/2003 | Sou |
| 2003/0182481 A1 | 9/2003 | Schoenborn |
| 2004/0202266 A1 | 10/2004 | Gregorius et al. |
| 2005/0111843 A1 | 5/2005 | Takeuchi et al. |
| 2006/0023602 A1 | 2/2006 | Rauschmayers |
| 2008/0049850 A1 | 2/2008 | Sidiropoulos et al. |
| 2008/0260071 A1 | 10/2008 | Sidiropoulos et al. |
| 2009/0035156 A1 | 2/2009 | Higashidozono et al. |
| 2009/0195360 A1 | 8/2009 | Jeon et al. |
| 2010/0164445 A1 | 7/2010 | Verma et al. |
| 2011/0228860 A1 | 9/2011 | Loinaz et al. |
| 2011/0228889 A1 | 9/2011 | Liu et al. |
| 2011/0231692 A1 | 9/2011 | Loinaz |

OTHER PUBLICATIONS

Mansuri et al. Jitter Optimization Based on Phase-Locked Loop Design Parameters, IEEE Journal of Solid-State Citcuits, vol. 37, No. 11, Nov. 2002.

Maxim et al., A Low-Jitter 125-1250-MHz Process-Independent and Ripple-Poleless 0.18-I-Jm CMOS PLL Based on a Sample-Reset Loop Filter, IEEE Journal of Solid-State Circuits, vol. 36, No. 11, Nov. 2001.

Maneatis, Self-Biased High-Bandwidth Low-Jitter 1-to-4096 Multiplier Clock Generator PLL, IEEE Journal of Solid-State Circuits, vol. 38, No. 11, Nov. 2003.

Sidiropoulos, A Semidigital Dual Delay-Locked Loop, IEEE Journal of Solid-State Circuits, vol. 32, No. 11, Nov. 1997.

Sidiropoulos et al., Adaptive Bandwidth DLLs and PLLs using Regulated Supply CMOS Buffers, 2000 Symposium on VLSI Circuits Digest of Technical Papers.

Office Action dated Mar. 21, 2006, for U.S. Appl. No. 10/176,495, filed Jun. 21, 2002.

Office Action dated Oct. 17, 2006 for U.S. Appl. No. 10/176,495, filed Jun. 21, 2002.

Office Action dated Jun. 14, 2007 for U.S. Appl. No. 10/176,495, filed Jun. 21, 2002.

Office Action dated Oct. 5, 2007 for U.S. Appl. No. 10/176,495, filed Jun. 21, 2002.

Office Action dated Jul. 1, 2008 for U.S. Appl. No. 10/176,495, filed Jun. 21, 2002.

Office Action dated Nov. 28, 2008 for U.S. Appl. No. 10/176,495, filed Jun. 21, 2002.

Office Action dated Oct. 30, 2009 for U.S. Appl. No. 10/176,495, filed Jun. 21, 2002.

Office Action dated Jun. 10, 2010 for U.S. Appl. No. 10/176,495, filed Jun. 21, 2002.

Office Action dated Nov. 15, 2010 for U.S. Appl. No. 10/176,495, filed Jun. 21, 2002.

Office Action dated Mar. 30, 2011 for U.S. Appl. No. 10/176,495, filed Jun. 21, 2002.

Office Action dated Oct. 14, 2011 for U.S. Appl. No. 10/176,495, filed Jun. 21, 2002.

Office Action dated Dec. 5, 2011 for U.S. Appl. No. 10/176,495, filed Jun. 21, 2002.

Office Action dated Oct. 6, 2009 for U.S. Appl. No. 11/930,978, filed Oct. 31, 2007.

Office Action dated Apr. 28, 2010 for U.S. Appl. No. 11/930,978, filed Oct. 31, 2007.

Office Action dated Dec. 22, 2010 for U.S. Appl. No. 11/930,978, filed Oct. 31, 2007.

Office Action dated Mar. 18, 2011 for U.S. Appl. No. 11/930,978, filed Oct. 31, 2007.

Office Action dated Sep. 19, 2011 for U.S. Appl. No. 11/930,978, filed Oct. 31, 2007.

Office Action dated Oct. 19, 2011 for U.S. Appl. No. 11/930,978, filed Oct. 31, 2007.

Co-pending Application, U.S. Appl. No. 12/185,750 inventors Sidiropoulos et al., filed on Aug. 4, 2008 (Not Published).

Co-pending Application, U.S. Appl. No. 12/828,125 inventor Cirit, H., filed on Jun. 30, 2010 (Not Published).

Co-pending Applications, U.S. Appl. No. 12/828,153, inventor Cirit, H., filed on Jun. 30, 2010 (Not Published).

* cited by examiner

PROGRAMMABLE DRIVE STRENGTH IN MEMORY SIGNALING

CROSS-REFERENCE TO RELATED APPLICATIONS

The present application is a continuation of co-pending U.S. patent application Ser. No. 12/728,101 filed on Mar. 19, 2010, which is hereby incorporated by reference in its entirety.

BACKGROUND OF THE INVENTION

1. Field of the Invention

The present invention is directed toward the field of memory signaling circuits, and more particularly to a programmable data buffer circuit and a programmable clock generator circuit.

2. Art Background

Figure 1:
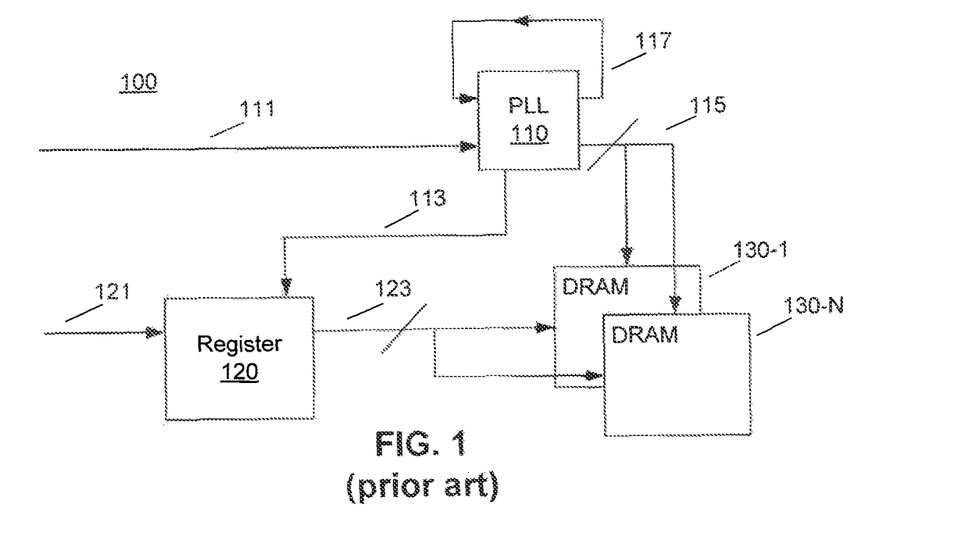
FIG. 1 is a block diagram of a prior art implementation of a data buffer and clock buffer in a dual inline memory module.

Many memory signal distribution methods rely on clock generation and data buffering integrated circuits (IC). A typical application for such ICs is a registered dual inline memory module (DIMM) 100, as shown in FIG. 1. The memory module input clock is fed to a phase-locked loop (PLL) based IC. The PLL-based IC 110 receives the input clock on a clock input 111. PLL-based IC 110 outputs a plurality of clocks to the DRAM ICs 130-1 to 130-N, and to the register IC 120. Both the DRAM and register ICs are mounted on the memory module. The register receives data input 121 and outputs a plurality of data signals to the DRAM ICs 130-1 to 130-N.

A given IC design, for either register or clock, is often sold for use in a variety of memory module configurations. This requires that the IC be able to drive signals to a variable number of memory ICs, depending on the implementation. Current designs must sacrifice precision for this versatility, driving a set of memory ICs at a signal strength that fails to optimize for either quality or speed.

What is needed is a method and/or device that permits tuning of signaling strength to implementation details in an economical fashion.

Further, what is needed is a method and/or device that, even when designed on a per-system or per-system basis, permits tuning at the per-lot level.

SUMMARY OF THE DISCLOSURE

Embodiments of the present invention preserve certain advantages of the prior art while introducing additional flexibility to permit a single design or class of designs to accommodate a wider range of applications. These embodiments not only perform feedback-based adjustment of the distributed data, but also permit individual tuning of data drive strength or current drive for each distribution line. Thus, data drive strength or current drive can be tuned to the skews present in the actual components being used for a given manufactured lot. The actual tuning can take place at manufacturing time, at each boot-up, or continuously during operation.

In one aspect, embodiments of the invention relate to programmable memory signaling circuits. For example, a programmable memory signaling circuit may comprise an intermediate circuit and a signal modulator. The intermediate circuit is configured for receiving memory signaling input and sending output memory signals along a series of signal lines with a signal character. The signal modulator is configured to determine the signal character based on a signal control input.

In another aspect, embodiments of the invention relate to programmable data register circuits. For example, some embodiments relate to a programmable data register circuit comprising a buffer circuit for receiving input data and sending output data along a series of signal lines, and a plurality of signal modulators, wherein each signal modulator is coupled to a signal line in the series and each signal modulator is configured to adjust a signal strength within the signal line.

In a further aspect, some embodiments relate to dual inline memory modules (DIMM). For example, a DIMM comprising a programmable memory signaling circuit (or programmable memory register circuit) as set forth above, and further comprising at least one memory integrated circuit. Preferably the memory IC is coupled to the programmable memory signaling circuit or register circuit for receiving one of the output memory signals (or output data signals).

In still another aspect, some embodiments relate to methods of optimizing signaling. For example, a method of optimizing signaling between a memory signaling circuit and a plurality of memory integrated circuits in a memory module. One such method comprises these steps: determining a preferable output signal character given the number of memory integrated circuits within the module, setting a memory signaling control value representing the preferable output control signal character, receiving signaling input, and sending memory control signals with a character based on the signaling control value.

DETAILED DESCRIPTION

This disclosure sets forth an architecture for a memory signaling IC which overcomes limitations of conventional memory signaling ICs by employing on-chip programmable drive generator(s) to appropriately adjust data signal drive to the implementation.

Structure

Figure 2A:
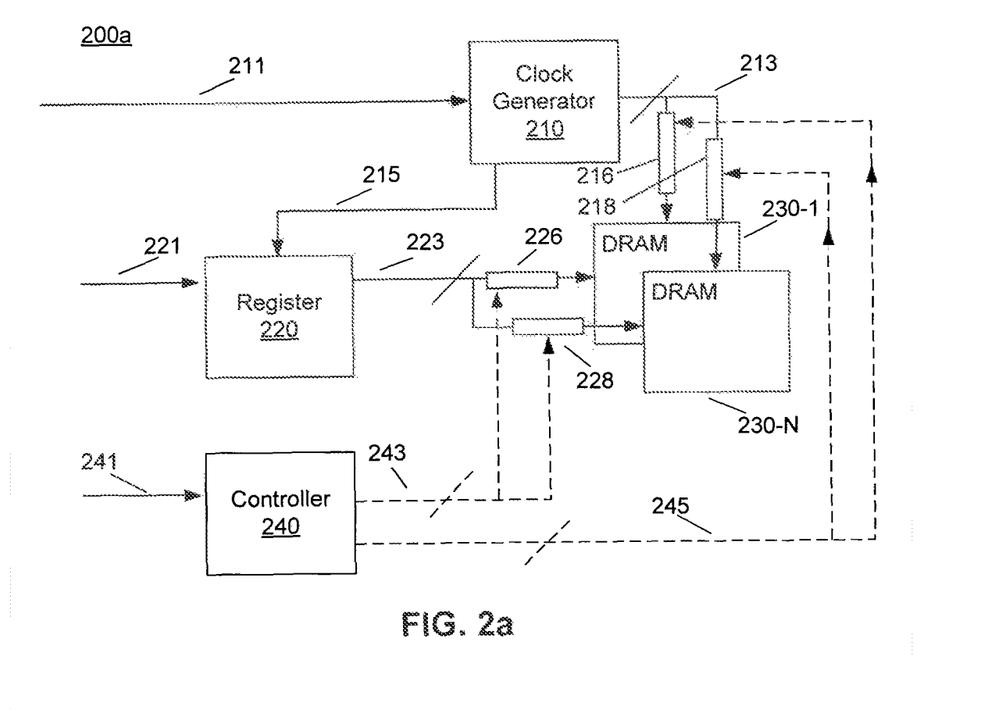
FIG. 2a is a block diagram of a dual inline memory module incorporating programmable data buffer and clock generator signal strengths consistent with some embodiments of the present invention.
Figure 2B:
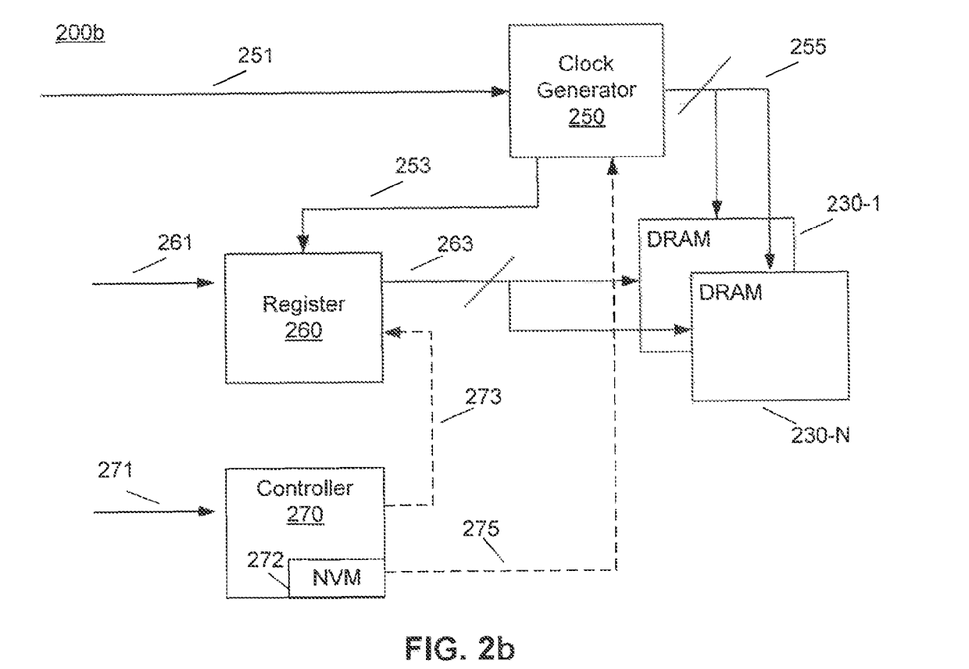
FIG. 2b is a block diagram of a dual inline memory module incorporating a programmable clock generator and data buffer consistent with some embodiments of the present invention.
Figure 2C:
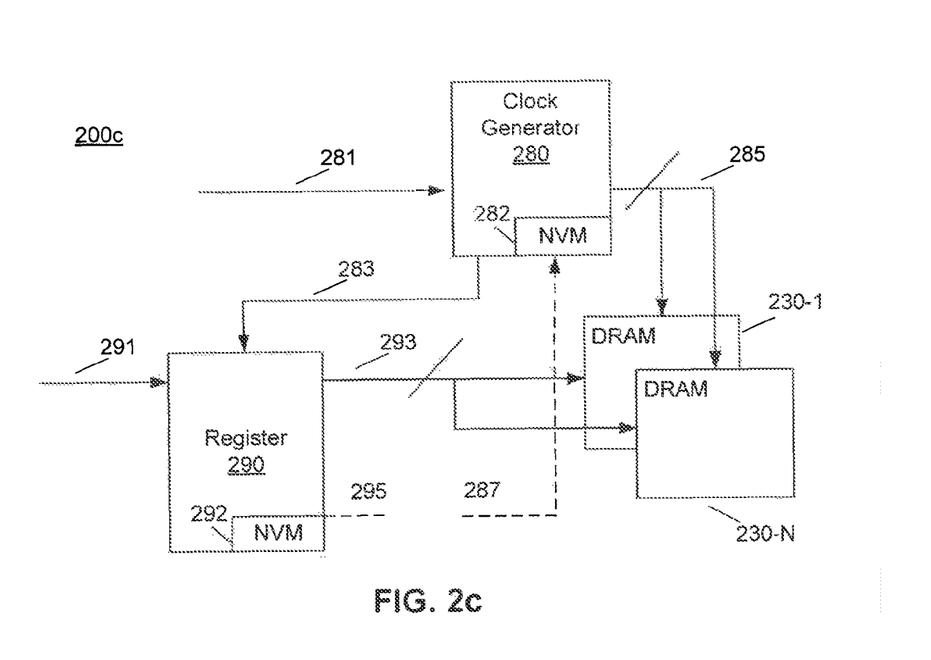
FIG. 2c is a block diagram of a dual inline memory module incorporating a programmable clock generator and data buffer consistent with some embodiments of the present invention.

FIGS. 2a-2c illustrate functional/block diagrams of programmable memory signaling systems consistent with embodiments of the present invention.

FIG. 2a illustrates an implementation 200a including programmable clock signaling and programmable data signaling consistent with some embodiments of the present invention. The system 200a comprises a clock generator 210, a register module 220, a controller module 240, and a plurality of memory modules 230-1 to 230-N.

The clock generator 210 is coupled to the memory modules 230-1 to 230-N through a clock signaling assembly 213 and to the register module 220 through the output line 215. The clock generator 210 is supplied with a reference signal through the input 211 and generates a clock output. The clock output is provided to the memory modules 230-1 to 230-N and to the register module 220.

The register module 220 is coupled to the memory modules 230-1 to 230-N through a data signaling assembly 223 and to the clock generator 210 through the clock output line 215. The register module 220 is supplied through the data input 221 and generates data output, which it provides to memory modules 230-1 to 230-N.

The controller module 240 is coupled to the clock signaling assembly 213 and the data signaling assembly 223. As illustrated, the clock signaling assembly 213 comprises an array of N signaling lines coupled to N signal modulators 216 to 218. Similarly, the data signaling assembly 223 comprises an array of N signaling lines coupled to N signal modulators 226 to 228. The clock signal control lines 245 couple the controller module 240 to each of the signal modulators within the clock signaling assembly 213. The data signal control lines 243 couple the controller module 240 to each of the signal modulators within the data signaling assembly 223. The controller module 240 receives control input from control pin 241.

The clock output of clock generator 210 is supplied to each of a plurality of signal modulators 216 to 218 in the clock signaling assembly 213. Each signal modulator 216 to 218 modulates the clock output signal based on a control input from the controller module 240. Similarly, the data output of register module 220 is supplied to each of a plurality of signal modulators 226 to 228 in the data signaling assembly 223. Each signal modulator 226 to 228 modulates the clock output signal based on a control input from the controller module 240. Preferably the signal modulators modulate the signals by adjusting the strength or current of the signals.

Preferably the clock generator 210, the register module 220, the controller module 240, the signal modulators 226 to 228, and the signal modulators 216 to 218 are all mounted on-chip relative to one another. However, in some embodiments these components are spread among multiple chips. Further, in some embodiments, a system includes programmable register elements but not programmable clock elements.

Some embodiments of the invention include a dual inline memory module comprising the elements of implementation 200a.

FIG. 2b illustrates an implementation 200b including programmable clock signaling and programmable data signaling consistent with some embodiments of the present invention. The system 200b comprises a clock generator 250, a register module 260, a controller module 270, and a plurality of memory modules 230-1 to 230-N.

The clock generator 250 is coupled to the memory modules 230-1 to 230-N through a clock signaling assembly 255 and to the register module 260 through the output line 253. The clock generator 250 is supplied with a reference signal through the input 251 and generates a clock. The clock is provided to the register module 260 through the output line 253. The clock is also used to generate a clock signal provided to the memory modules 230-1 to 230-N through the clock signaling assembly 255. As illustrated, the clock signaling assembly 255 comprises an array of N signaling lines. The clock of clock generator 250 is modulated and provided through the clock signaling assembly 255 to the memory modules. Preferably, the signal is modulated based on a control input from the controller module 270. Preferably modulation of the clock includes adjustment of the clock signal strength, and, in some embodiments, the clock phase.

The register module 260 is coupled to the memory modules 230-1 to 230-N through a data signaling assembly 263. The register module 260 is supplied with data through the input 261 and generates a data signal based on that data. The data signal is provided to the memory modules 230-1 to 230-N through the data signaling assembly 263. As illustrated, the clock signaling assembly 263 comprises an array of N signaling lines. The data signal modulated and provided through the data signaling assembly 263 to the memory modules. Preferably the signal is modulated based on a control input from the controller module 270. Preferably modulation of the data signal includes adjustment of the data signal strength.

The controller module 270 is coupled to the clock generator 250 and the register module 260. The clock control line 275 couples the controller module 270 to the clock generator 250. The data control line 273 couples the controller module 270 to the register module 260. The controller module 270 receives control input from control pin 271. Further, the controller module 270 includes the non-volatile memory 272 configured to store control values.

Preferably the clock generator 250, the register module 260, and the controller module 270 are all mounted on-chip relative to one another. However, in some embodiments these components are spread among multiple chips. Further, in some embodiments, a system includes programmable register elements but not programmable clock elements.

Some embodiments of the invention include a dual inline memory module comprising the elements of implementation 200b.

FIG. 2c illustrates an implementation 200c including programmable clock signaling and programmable data signaling consistent with some embodiments of the present invention. The system 200c comprises a clock generator 280, a register module 290, and a plurality of memory modules 230-1 to 230-N.

The clock generator 280 comprises a non-volatile memory 282 and is coupled to the memory modules 230-1 to 230-N through a clock signaling assembly 285 and to the register module 290 through the output line 283. The clock generator 280 is supplied with a reference signal through the input 281 and generates a clock. The clock is provided to the register module 290 through the output line 283. The clock is also used to generate a clock signal provided to the memory modules 230-1 to 230-N through the clock signaling assembly 285. As illustrated, the clock signaling assembly 285 comprises an array of N signaling lines. The clock of clock generator 280 is modulated and provided through the clock signaling assembly 285 to the memory modules. Preferably the signal is modulated based on control values stored in the NVM 282. Most preferably these values are set through a control input 287. Preferably modulation of the clock includes adjustment of the clock signal strength, and in some embodiments, the phase of the clock.

The register module 290 comprises a non-volatile memory 292 is coupled to the memory modules 230-1 to 230-N through a clock signaling assembly 293. The register module 290 is supplied with data through the input 291 and generates a data signal based on that data. The data signal is provided to the memory modules 230-1 to 230-N through the data signaling assembly 293. As illustrated, the clock signaling assembly 293 comprises an array of N signaling lines. The data signal modulated and provided through the data signaling assembly 293 to the memory modules. Preferably the signal is modulated based on control values stored in the NVM 292. Most preferably these values are set through a control input 295. Preferably modulation of the clock includes adjustment of the clock signal strength.

Preferably the clock generator 280 and the register module 290 are mounted on-chip relative to one another. However, in some embodiments these components are spread among multiple chips. Further, in some embodiments, a system includes programmable register elements but not programmable clock elements.

Some embodiments of the invention include a dual inline memory module comprising the elements of implementation 200c.

Figure 3A:
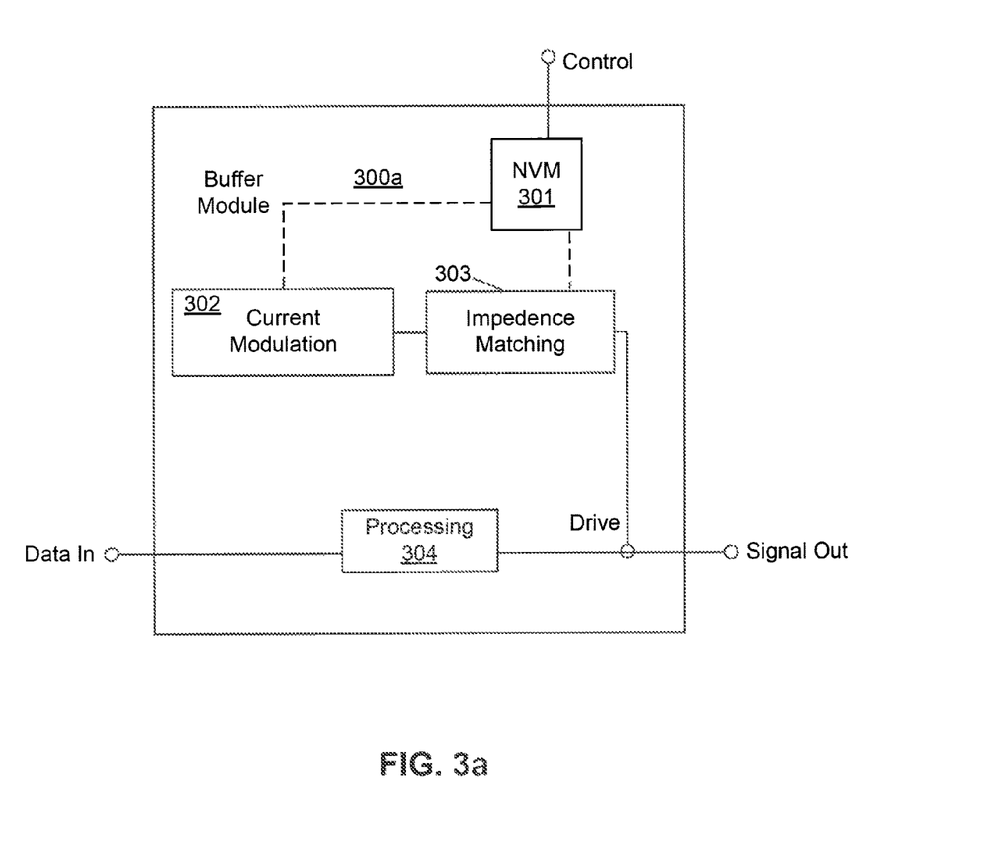
FIG. 3a is a block diagram of a memory register IC incorporating programmable signal strength consistent with some embodiments of the present invention.

FIG. 3a illustrates a functional/block diagram of a programmable data buffer 300a consistent with some embodiments of the present invention. The programmable data buffer 300a is preferably implemented in a single IC and comprises a non-volatile memory 301, a current modulation module 302, an impedance matching module 303, and a processing module 304. In some embodiments the circuit is implemented in more than one IC.

The processing module 304 receives data through the "Data In" input, processes the data, and outputs a signal. The current modulation 302 and impedance matching 303 modules receive High and Low Reference inputs, and generate a Drive signal based on values stored in the NVM 301. The buffer 300a outputs a data signal based on the output of the processing module 304 and the Drive signal.

Figure 3B:
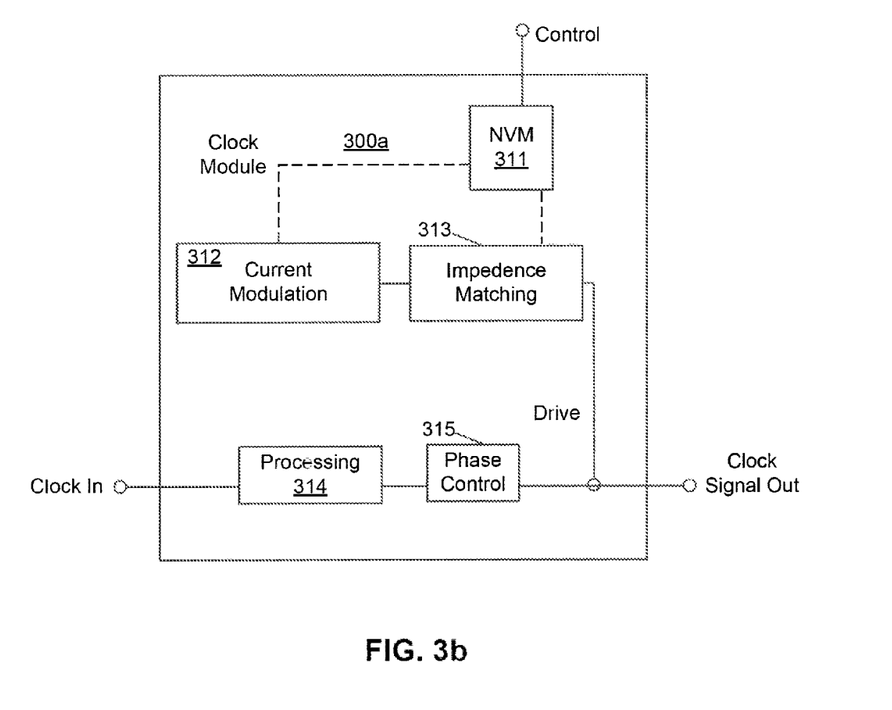
FIG. 3b is a block diagram of a clock generator IC incorporating programmable signal strength consistent with some embodiments of the present invention.

FIG. 3b illustrates a functional/block diagram of a programmable clock generator 300a consistent with some embodiments of the present invention. The programmable clock generator 300a is preferably implemented in a single IC and comprises a non-volatile memory 311, a current modulation module 312, an impedance matching module 313, and a processing module 314. In some embodiments the circuit is implemented in more than one IC.

The processing module 314 receives a reference clock through the Clock in input, processes the data, and outputs a dock signal. The current modulation 312 and impedance matching 313 modules generate a Drive signal based on values stored in the NVM 311. The clock generator 300b outputs a clock signal based on the output of the processing module 314 and the Drive signal.

Figure 5:
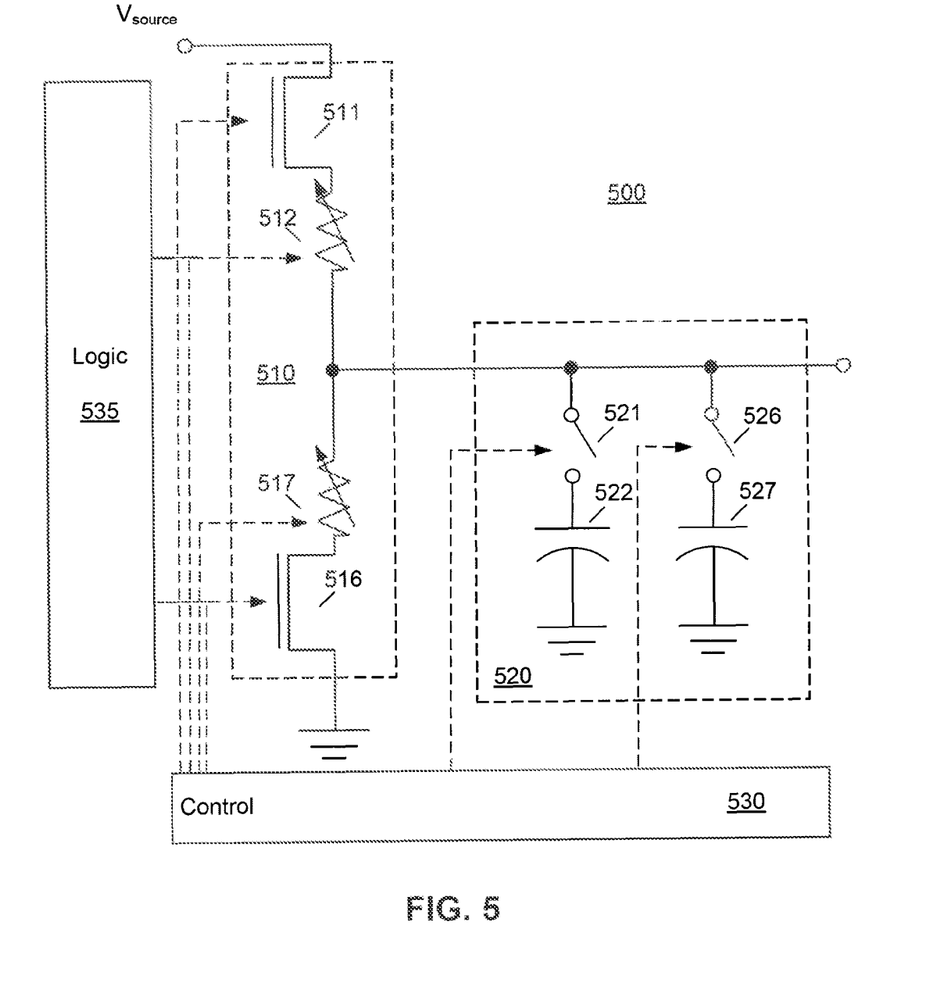
FIG. 5 is a circuit diagram of a memory signaling modulator consistent with some embodiments of the present invention.

FIGS. 3a and 3b both include signal modulators. In both FIGS. 3a and 3b. the signal modulators comprise current modulators and impedance matchers. In some embodiments of the present invention signal modulators include only current modulators, while some embodiments include only impedance matchers. FIG. 5 illustrates a circuit 500 implementing both current modulation 510 and impedance matching 520 consistent with some embodiments of the present invention.

In the circuit 500, logic 535 provides data input signals in a complementary configuration into the current modulator 510 (i.e., a first data signal is input to p-type transistor 511 and a second data signal, the complement of the first data signal, is input to n-type transistor 516). Within the current modulator 510, the transistors 511 and 516 provide high/low signaling capability while the variable resistors 512 and 517 provide signal current modulation. An output signal is passed from the current modulator 510 to the impedance matcher 520.

Within the impedance matcher 520, the first switch 521 and first capacitor 522 provide impedance matching within a first range, while the second switch 526 and second capacitor 527 provide impedance matching within a second range.

Both the current modulator and the impedance matcher are controlled by controller 530. In some embodiments controller 530 is off-chip. Preferably, however, the controller 530 is on-chip. Also controller 530 preferably comprises a non-volatile memory. Though the switching within the current modulator 510 are depicted as CMOS, other switching technologies are possible. Preferably, the variable resistors within the current modulator 510 provide resistance in the range of 10 to 60 Ohms. Preferably, the capacitors within the impedance matcher provide capacitance in the range of 100 femto-Farads to 2 pico-Farads.

Figure 4:
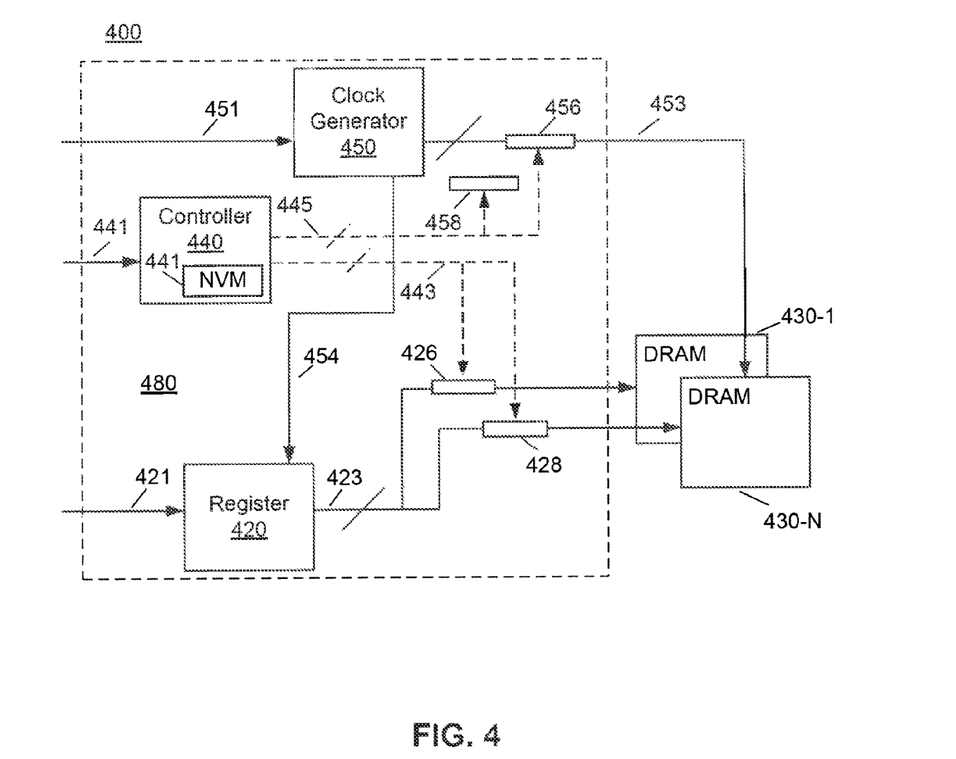
FIG. 4 is a block diagram of a programmable data buffer and clock generator IC implemented in a dual inline memory module consistent with some embodiments of the present invention.

FIG. 4 illustrates a clock generator and data buffer with programmable signal strength implemented on a single IC 480 and incorporated in a dual-in-line-memory module ("DIMM") 400 consistent with some embodiments of the present invention. The IC 480 comprises a clock generator 450, a register module 420, and a controller module 440. The IC 480 is coupled to a plurality of memory modules 430-1 to 430-N.

The clock generator 450 is coupled to the memory modules 430-1 to 430-N through a clock signaling assembly 453 and to the register module 420 through the output line 414. The clock generator 450 is supplied with a reference signal through the input 411 and generates a clock output. The clock output is provided to the memory modules 430-1 to 430-N and to the register module 420.

The register module 420 is coupled to the memory modules 430-1 to 430-N through a data signaling assembly 423 and to the clock generator 450 through the clock output line 414. The register module 420 is supplied through the data input 421 and generates data output, which it provides to memory modules 430-1 to 430-N.

The controller module 440 is coupled to the clock signaling assembly 453 and the data signaling assembly 423. As illustrated, the clock signaling assembly 453 comprises an array of N signaling lines coupled to N signal modulators 456 to 458. Similarly, the data signaling assembly 423 comprises an array of N signaling lines coupled to N signal modulators 426 to 428. The clock signal control lines 445 couple the controller module 440 to each of the signal modulators within the clock signaling assembly 453. The data signal control lines 443 couple the controller module 440 to each of the signal modulators within the data signaling assembly 423. The controller module 440 receives control input from control pin 441.

The clock output of clock generator 450 is supplied to each of a plurality of signal modulators 456 to 458 in the clock signaling assembly 453. Each signal modulator 456 to 458 modulates the clock output signal based on a control input from the controller module 440. Similarly, the data output of register module 420 is supplied to each of a plurality of signal modulators 426 to 428 in the data signaling assembly 423. Each signal modulator 426 to 428 modulates the clock output signal based on a control input from the controller module 440. Preferably the signal modulators modulate the signals by adjusting the strength of the signals, and in some embodiments, adjusting the phase of the clock signals.

In some embodiments, a system such as in FIG. 4 includes programmable register elements but not programmable clock elements.

Programming

Consistent with the present invention, the specific signal strengths in programmable modes of an IC can be fixed during manufacturing, determined at each system boot-up, or re-set on a relatively continuous basis.

In applications, such as registered DIMMs, that do not provide for a calibration cycle on boot-up, the extended skew calibration mode is preferably entered only during testing and manufacturing. Preferably appropriate control values are stored in a non-volatile memory (NVM). Exemplary NVMs include EEPROM or FLASH memory; the NVM can be located either on-chip or off-chip.

In applications that provide for boot-up calibration cycles, an appropriate delay is preferably set on each boot-up via logic programmed into the controller block. For example, such logic can be programmed into a controller block via firmware.

Advantages

Embodiments of the present invention preserve certain advantages of the prior art while introducing additional flexibility to permit a single design or class of designs to accommodate a wider range of applications. These embodiments not only perform adjustment of the distributed signals, but also permit individual tuning of signal strength within each distribution line. Thus, signal strength can be tuned to the skews present in the actual components being used for a given manufactured lot. The actual tuning can take place at manufacturing time, at each boot-up, or continuously during operation.

Though the preferred application envisioned for embodiments of the present invention is in registered memory modules, the invention applies to other applications that require variable drive strength.

Although the present invention has been described in terms of specific exemplary embodiments, it will be appreciated that various modifications and alterations might be made by those skilled in the art without departing from the spirit and scope of the invention. The scope of the invention is not limited to the exemplary embodiments described and should be ascertained by inspecting the appended claims.

What is claimed is:

1. A method of tuning a memory circuit, comprising:
receiving a control signal that contains data indicative of a desired output characteristic;
storing the data indicative of a desired output characteristic as a control value in a non-volatile memory;
generating an output signal based on an input signal; and
tuning the generated output signal so that it conforms to the desired output characteristic based on the control value stored in the non-volatile memory.

2. The method of claim 1, wherein the receiving the control signal comprises:
receiving the control signal that contains the data indicative of at least one of: a current, an output impedance, and a phase.

3. The method of claim 1, further comprising:
storing the received data in the non-volatile memory.

4. The method of claim 3, further comprising:
retrieving the stored data from the non-volatile memory.

5. The method of claim 4, wherein the generating comprises:
generating the output signal based on the stored data retrieved from the non-volatile memory.

6. The method of claim 1, further comprising:
receiving a second control signal that contains second data indicative of a new desired output characteristic.

7. The method of claim 6, further comprising:
re-tuning the generated output signal so that it conforms with the new desired output characteristic.

8. The method of claim 1, wherein the receiving the control signal comprises:
receiving the control signal when the memory circuit boots up.

9. The method of claim 1, further comprising:
receiving a new control signal at regular intervals while the memory circuit is operating.

10. The method of claim 1, wherein the receiving the input signal comprises:
receiving a clock signal.

11. A circuit for use in a memory, comprising:
a control signal input configured to receive a control signal containing data indicative of a desired output characteristic;
a non-volatile memory configured to store the data indicative of the desired output characteristic;
a processor configured to generate an output signal based on a received input signal; and
a signal modulator configured to tune the generated output signal so that it conforms to the desired output characteristic.

12. The circuit of claim 11, wherein the desired output characteristic includes at least one of: a current, an output impedance, and a phase.

13. The circuit of claim 11, wherein the signal modulator is configured to tune the generated output signal according to the stored data retrieved from the non-volatile memory.

14. The circuit of claim 11, wherein the non-volatile memory is further configured to store second data indicative of a new desired output characteristic.

15. The circuit of claim 14, wherein the signal modulator is further configured to re-tune the generated output signal so that it conforms with the new desired output characteristic.

16. The circuit of claim 11, wherein the control signal input is configured to receive the control signal when the memory boots up.

17. The circuit of claim 11, wherein the control signal input is configured to receive a new control signal at regular intervals while the memory is operating.

18. The circuit of claim 11, wherein the signal modulator comprises at least one of: a current modulator, an impedance matcher, and a phase controller.

19. The circuit of claim 11, wherein the received input signal comprises a clock input signal.

20. A non-transitory computer-readable medium containing computer instructions that, when executed by a processor, cause the processor to perform steps, comprising:
receiving a control signal that contains data indicative of a desired output characteristic;
storing the data indicative of the desired output characteristic as a control value in a non-volatile memory;
generating an output signal based on an input signal; and
tuning the generated output signal so that it conforms to the desired output characteristic based on the control value stored in the non-volatile memory.

* * * * *

UNITED STATES PATENT AND TRADEMARK OFFICE
CERTIFICATE OF CORRECTION

PATENT NO. : 8,700,944 B2
APPLICATION NO. : 13/762927
DATED : April 15, 2014
INVENTOR(S) : Marc Loinaz It is certified that error appears in the above-identified patent and that said Letters Patent is hereby corrected as shown below:

On the Title Page

Other Publications, Item (56), Page 2, in the Mansuri et al. listing, replace "Citcuits" with --Circuits--.

In the Claims

In Column 7, line 51, Claim 1, replace "a" with --the--.

Signed and Sealed this
Eighth Day of July, 2014

Michelle K. Lee
*Deputy Director of the United States Patent and Trademark Office*